(12) United States Patent
Uenishi et al.

(10) Patent No.: US 11,402,822 B2
(45) Date of Patent: *Aug. 2, 2022

(54) NUMERICAL CONTROLLER

(71) Applicant: FANUC CORPORATION, Yamanashi (JP)

(72) Inventors: Daisuke Uenishi, Yamanashi (JP); Chikara Tango, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 348 days.

This patent is subject to a terminal disclaimer.

(21) Appl. No.: 16/663,686

(22) Filed: Oct. 25, 2019

(65) Prior Publication Data

US 2020/0133242 A1 Apr. 30, 2020

(30) Foreign Application Priority Data

Oct. 31, 2018 (JP) .............................. JP2018-205702

(51) Int. Cl.
*G05B 19/4155* (2006.01)

(52) U.S. Cl.
CPC ............ *G05B 19/4155* (2013.01); *G05B 2219/35386* (2013.01); *G05B 2219/42173* (2013.01)

(58) Field of Classification Search
None
See application file for complete search history.

(56) References Cited

U.S. PATENT DOCUMENTS

2006/0229761 A1  10/2006 Kita et al.
2008/0024083 A1   1/2008 Yamaguchi et al.
(Continued)

FOREIGN PATENT DOCUMENTS

JP  H07-191728 A  7/1995
JP  H10-254517 A  9/1998
(Continued)

OTHER PUBLICATIONS

An Office Action issued by the United States Patent and Trademark Office dated Nov. 29, 2021, which corresponds to U.S. Appl. No. 16/663,577 and is related to U.S. Appl. No. 16/663,686.
(Continued)

*Primary Examiner* — Sean Shechtman
(74) *Attorney, Agent, or Firm* — Studebaker & Brackett PC

(57) ABSTRACT

To provide a numerical controller that can detect a position in a machining program at which a speed control abnormality is likely to occur due to an insufficient look-ahead blocks that are used to determine an acceleration/deceleration operation, and start a look-ahead processing function from the position in parallel with looking ahead at the machining program from the start of the machining program. A numerical controller includes a program execution unit that executes a machining program, a program look-ahead unit that simultaneously looks ahead at the machining program from different blocks in the machining program in parallel with execution of the machining program and that includes a first program look-ahead unit and a second program look-ahead unit, and a look-ahead allocation unit that divides a storage unit into at least a first region and a second region and instructs the first program look-ahead unit to perform a look-ahead action of storing look-ahead blocks in the first region and instructs the second program look-ahead unit to perform a look-ahead action of storing look-ahead blocks in the second region.

5 Claims, 12 Drawing Sheets

(56) References Cited

U.S. PATENT DOCUMENTS

2008/0294877 A1* 11/2008 Haga ................ G05B 19/4155
                                                      712/216
2016/0375582 A1    12/2016 Nakajima et al.
2019/0278248 A1     9/2019 Sagasaki
2020/0133242 A1     4/2020 Uenishi et al.

FOREIGN PATENT DOCUMENTS

JP    2001-034320 A    2/2001
JP       3723015 B2   12/2005

OTHER PUBLICATIONS

An Office Action mailed by the United States Patent and Trademark Office dated Dec. 8, 2021, which corresponds to U.S. Appl. No. 16/662,412 and is related to U.S. Appl. No. 16/663,686.
An Office Action; "Notice of Reasons for Refusal", mailed by the Japanese Patent Office dated Dec. 8, 2020, which corresponds to Japanese Patent Application No. 2018-205918 and is related to U.S. Appl. No. 16/663,686; with English language translation.

* cited by examiner

NUMERICAL CONTROLLER

This application is based on and claims the benefit of priority from Japanese Patent Application No. 2018-205702, filed on 31 Oct. 2018, the content of which is incorporated herein by reference.

BACKGROUND OF THE INVENTION

Field of the Invention

The present invention relates to a numerical controller.

Related Art

In the manufacturing industry today, IT parts and other devices are being manufactured on smaller scales and with higher precision, and interest in high-speed and high-precision machining is on the rise.

In order to achieve even higher quality in machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created, and this trend is expected to grow in years to come.

One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines.

Therefore, machining programs are now made up of more blocks.

In the prior art, a numerical controller looks ahead at programs and reads out and processes a program for blocks to be executed next according to the first in, first out (FIFO) method from a number of programs stored in advance equal to look-ahead blocks. Then, the numerical controller determines an acceleration/deceleration operation and performs axis control.

However, such high-quality machining programs have the following problem.

That is, the programs have short minute straight lines and fast command speed which means that, if the processing time for executing the program is less than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

FIG. 11 is a graph showing the difference in acceleration/deceleration over time when change in speed is unstable.

As illustrated in FIG. 11, speed initially moves stably at a command speed of 6,000 mm/min. At 2,000 mm/min, processing time for executing the program is too short and the look-ahead blocks used to determine the acceleration/deceleration operation could not be secured. Therefore, speed became unstable and moved slightly as indicated by the arrow in FIG. 11.

Such behavior is particularly significant when a machine tool has a large number of axes, such as in 5-axis machining, and the processing power of the numerical controller is decreased. These problems can be solved by increasing the processing power of the numerical controller used for looking ahead or executing machining programs. However, similar problems occur when command speed is further increased by making programs more detailed or updating machines.

In order to provide a solution to these problems, the invention described in Patent Document 1 discloses a technology in which a numerical controller monitors whether if there is a deficiency or an excess of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

An example of a position at which data is insufficient in a machining program is a position at which minute straight lines are continuous with each other, as described above. At such a position, a speed control abnormality occurs.

When roughing, generally speaking there is no machining process in which minute straight lines are continuous with each other. Instead, the look-ahead blocks are constantly at an upper limit and too much processing power may be used. When finishing, the tool needs to be replaced directly before machining starts and this stops the look-ahead function, or a cancel code enters the program and machining starts without a significant look-ahead blocks. As a result, the processing enters a machining portion at which minute straight lines are continuous and the look-ahead blocks become zero.

FIG. 12 is a graph for showing difference in the look-ahead blocks over time in the above-described case.

During roughing, the maximum look-ahead blocks (1,000 blocks, which is considerably larger than the required look-ahead blocks) are maintained.

Then, in a section at which the look-ahead function stops due to the tool needing to be replaced or a cancel code entering the program, the look-ahead blocks decrease and eventually become zero.

The processing then moves to processing blocks that correspond to the finishing processing in the machining program. However, finishing is started while the look-ahead blocks only increase to 300, and hence the look-ahead blocks eventually become zero.

The technology disclosed in Patent Document 1 simply increases the priority of the NC data analysis processing task when it is determined that there is insufficient data and does not determine what data in the NC data is insufficient or at which position there is insufficient data, and is therefore unable to deal with speed control abnormalities at places where data is insufficient.

It is an object of the present invention to provide a numerical controller that can detect a position in a machining program at which a speed control abnormality is likely to occur due to an insufficient look-ahead blocks that are used to determine an acceleration/deceleration operation, and start a look-ahead processing function from the position in parallel with looking ahead at the machining program from the start of the machining program in order to stabilize feed rate, cutting speed and other factors.

(1) A numerical controller according to the present invention is a numerical controller for controlling a machine tool that has axes by executing a machining program that is made up of a plurality of blocks and that controls acceleration/deceleration of the axes, the numerical controller including a control unit (for example, a "CPU 11" to be described later) and a storage unit (for example, a "RAM 13" to be described later), the control unit including: a program execution unit (for example, a "program execution unit 111" to be described later) that executes the machining program; a program look-ahead unit (for example, a "program look-ahead unit 112" to be described later) that simultaneously looks ahead at the machining program from different blocks in the machining program in parallel with execution of the machining program and includes a first program look-ahead unit (for example, a "first program look-ahead unit 112*a*" to be described later) and a second program look-ahead unit (for example, a "second program look-ahead unit 112*b*" to be described later); and a look-ahead allocation unit (for example, a "look-ahead allocation unit 115" to be described later) that divides the storage unit into at least a first region and a second region and instructs the first program look-ahead unit to perform a look-ahead action of storing look-ahead blocks in the first region and instructs the second program look-ahead unit to perform a look-ahead action of storing look-ahead blocks in the second region.

(2) The numerical controller described in Item (1) may further include a look-ahead blocks calculation unit (for example, a "look-ahead blocks calculation unit 113" to be described later) that calculates look-ahead blocks, which is the difference between a first sequence number that is the number of a block being executed by the program execution unit and a second sequence number that is the number of a block that is looked ahead by the first program look-ahead unit while the block is being executed; and an exhaustion block detection unit (for example, an "exhaustion block detection unit 114" to be described later) that detects an exhaustion block, which is a block at which the look-ahead blocks fall below a prescribed value, in which, after the exhaustion block is detected, the look-ahead allocation unit may instruct the first program look-ahead unit to look ahead from a start block of the machining program and instruct the second program look-ahead unit to look ahead from the exhaustion block.

(3) The numerical controller described in Item (1) may further include a machining precision index calculation unit (for example, a "machining precision index calculation unit 116" to be described later) that calculates a machining precision index that indicates machining precision at each block of the machining program; and a machining precision requirement block detection unit (for example, a "machining precision requirement block detection unit 117" to be described later) that detects a machining precision requirement block, which is a block at which the machining precision index is more than a prescribed value, in which, after the exhaustion block is detected, the look-ahead allocation unit may instruct the first program look-ahead unit to look ahead from a start block of the machining program and instruct the second program look-ahead unit to look ahead from the machining precision requirement block.

According to the present invention, it is possible to detect a position in a machining program at which a speed control abnormality is likely to occur due to an insufficient look-ahead blocks that are used to determine an acceleration/deceleration operation, and start a look-ahead processing function from the position in parallel with looking ahead at the machining program from the start of the machining program in order to stabilize feed rate, cutting speed and other factors.

DETAILED DESCRIPTION OF THE INVENTION

<1. First Embodiment>

Now, a first embodiment of the present invention is described with reference to FIGS. 1 to 8.

<1.1 Configuration of Invention>

Figure 1:
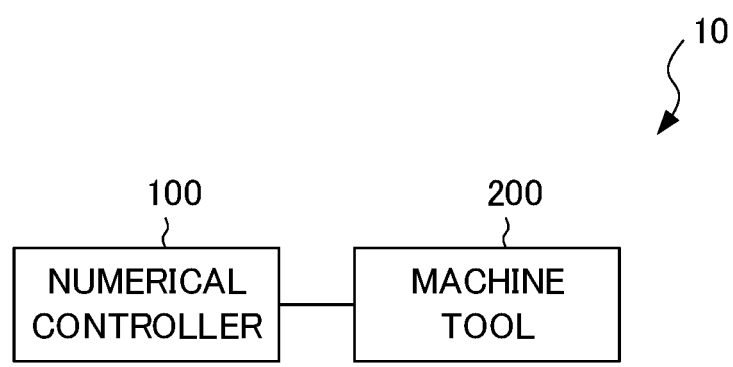
FIG. 1 is a diagram for illustrating the configuration of a control system including a numerical controller according to a first embodiment of the present invention.

FIG. 1 illustrates the configuration of a control system 10 that includes a numerical controller 100 according to a first embodiment of the present invention and a machine tool 200 that is controlled by the numerical controller 100.

The numerical controller 100 is a machine that outputs an operation command to the machine tool 200 to numerically control the machine tool 200 using functions to be described later.

A detailed description of the configuration and functions of the numerical controller 100 is provided later.

The machine tool 200 is a device that performs predetermined machining such as cutting.

The machine tool 200 includes a motor that is driven to machine workpiece and a spindle and a feed axis that are attached to the motor. The machine tool 200 also includes fixtures and tools that correspond to the respective axes.

The motor of the machine tool 200 is driven on the basis of an operation command that is output from the numerical controller 100 such that the machine tool 200 performs predetermined machining.

Herein, the contents of the predetermined machining are not particularly limited and types of machining other than cutting, such as grinding, polishing, rolling or forging, may also be employed.

Figure 2:
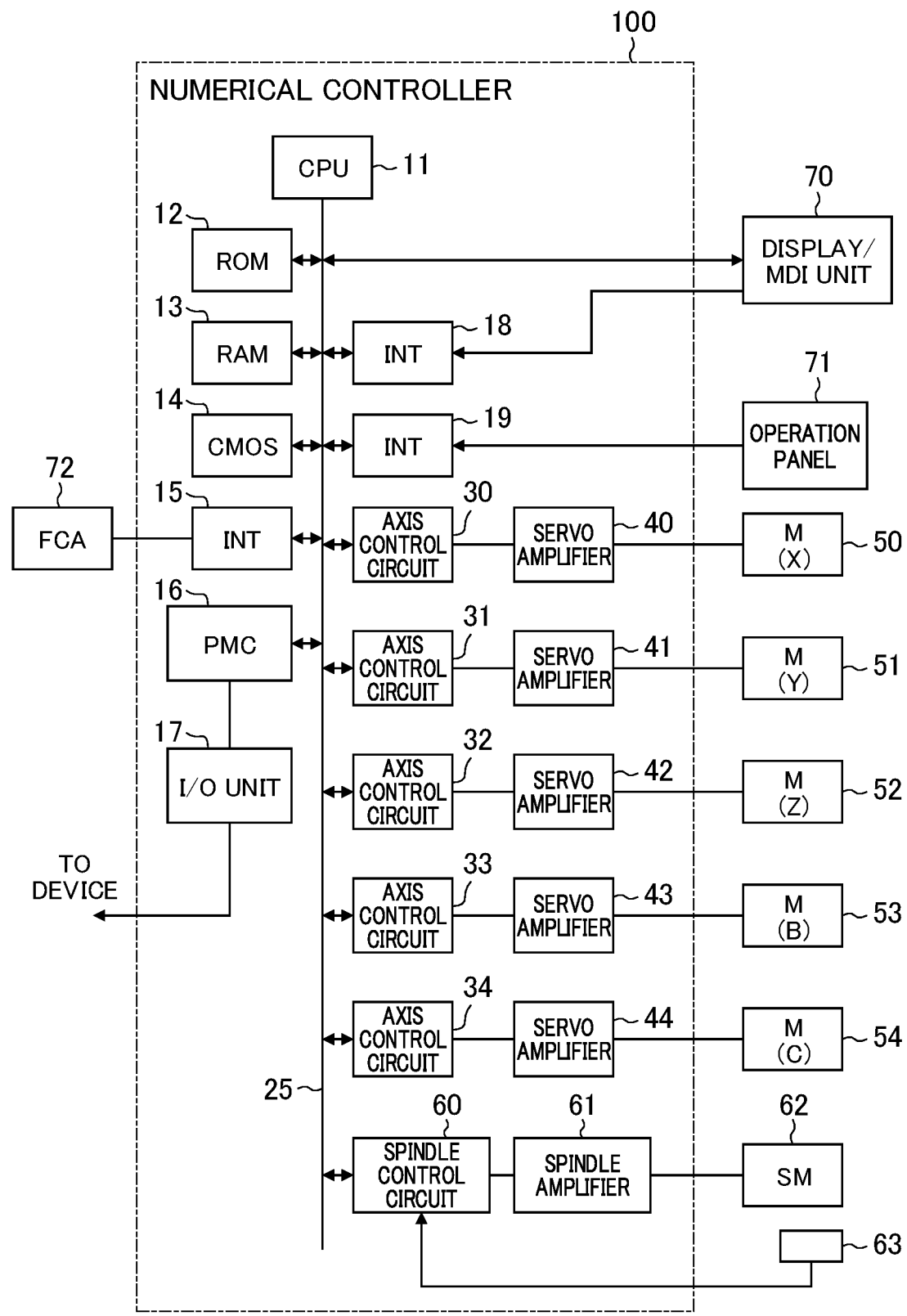
FIG. 2 is a diagram for illustrating the configuration of the numerical controller according to the first embodiment of the present invention.

FIG. 2 illustrates an exemplary configuration of the numerical controller 100 according to the embodiment of the present invention.

The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100.

The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is turned off. The CMOS memory 14 stores a machining program that was read to the CMOS memory 14 via the interface 15, a machining program that was input to the CMOS memory 14 via the display/MDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor.

Machining programs, various parameters and other data are read from the external device 72 side.

Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device.

The PMC 16 receives signals such as those for various switches on an operation panel provided in the body of the machine tool, and transmits those signals to the CPU 11 after executing required signal processing.

The display/MDI unit 70 is a manual data input device that includes components such as a display and a keyboard.

The interface 18 receives commands and data from a keyboard in the display/MDI unit 70 and transfers those commands and data to the CPU 11.

The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis.

Each servo motor 50 to 54 for each axis includes a position/speed detector. The position/speed detectors output position/speed feedback signals that are fed back to each axis control circuit 30 to 34 to perform feedback control for position/speed.

Note that this position/speed feedback is omitted from the block diagrams.

The spindle control circuit 60 receives a spindle rotation command for the machine tool and outputs a spindle speed signal to the spindle amplifier 61.

The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component.

The pulse encoder 63 outputs a feedback pulse in synchronization with rotation of the spindle.

The feedback pulse is read by the CPU 11 via the bus 25.

In the exemplary configuration of the numerical controller 100 illustrated in FIG. 2, five axis control circuits (axis control circuits 30 to 34) and five servo motors (servo motors 50 to 54) are illustrated.

However, the present invention is not limited to this configuration and any number of axis control circuits and servo motors may be provided.

Figure 3:
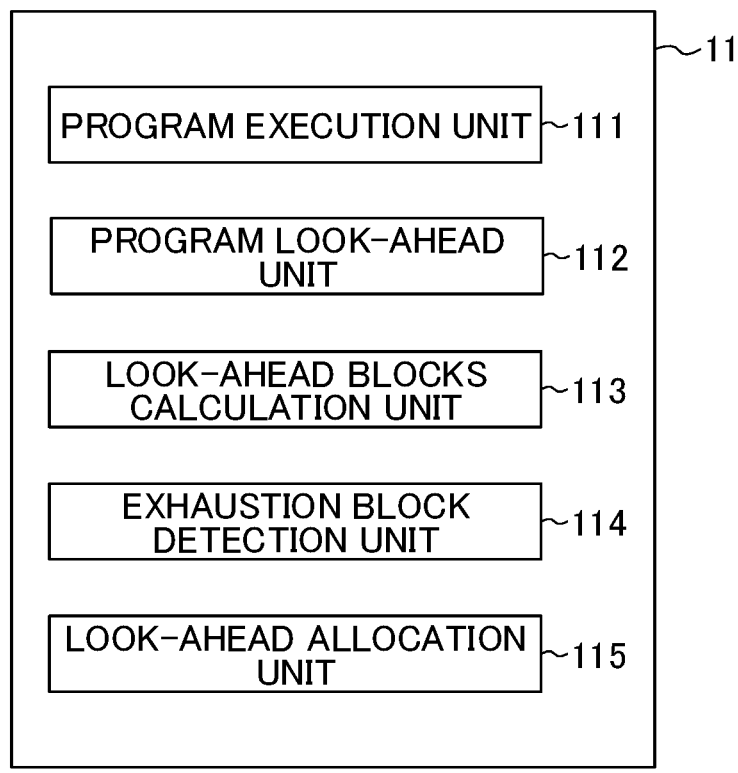
FIG. 3 is a diagram for illustrating function blocks for the numerical controller according to the first embodiment of the present invention.

FIG. 3 is a function block diagram for illustrating a function where the CPU 11 reads out system programs and application programs stored in the ROM 12 via the bus 25 and implements the present invention according to those system programs and application programs.

The CPU 11 includes a program execution unit 111, a program look-ahead unit 112, look-ahead blocks calculation unit 113, an exhaustion block detection unit 114 and a look-ahead allocation unit 115.

The program execution unit 111 executes a machining program.

More specifically, in this embodiment, the program execution unit 111 executes a simulation of the machining program.

During this simulation, it is preferable, for example, that workpiece be placed on the machine tool 200 and the machine tool 200 be actually operated, instead of just executing the machining program idly.

This is because the difference in look-ahead blocks over time (to be described later) changes depending on the operating environment and the axis configuration of the machine tool 200.

In parallel with the simulation of the machining program executed by the program execution unit 111, the program look-ahead unit 112 looks ahead at the machining program before the simulation is executed.

Figure 4:
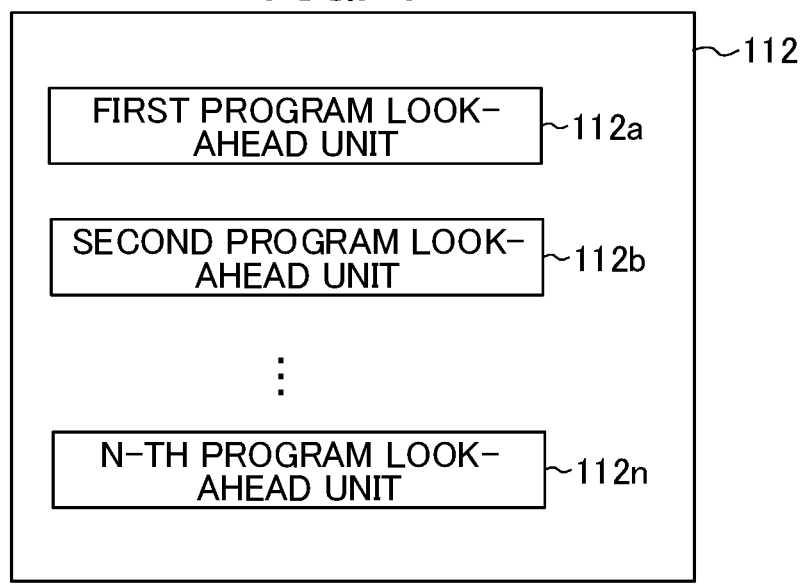
FIG. 4 is a diagram for illustrating function blocks for the numerical controller according to the first embodiment of the present invention.

FIG. 4 illustrates an exemplary configuration of the program look-ahead unit 112.

The program look-ahead unit 112 includes a first program look-ahead unit 112a, a second program look-ahead unit 112b until an n-th program look-ahead unit 112n.

These program look-ahead units 112 look ahead at a machining program from different positions in the machining program.

The look-ahead blocks are zero when the position of a block to be looked ahead by the program look-ahead unit 112 or the position of a block to be executed by the program execution unit 111 reaches the end of the machining program. However, the look-ahead blocks do not usually evenly decrease to zero. The rate of reduction of look-ahead blocks changes depending on the processing time for each block, which differs due to a change in the curvature of the machining path or the axis configuration.

In particular, if the speed at which the program execution unit 111 executes the machining program becomes faster and the processing time for each block becomes shorter at a position in the machining program at which minute straight lines are continuous, the rate of reduction of look-ahead blocks will increase.

When this happens, the look-ahead blocks that are used to determine the acceleration/deceleration operation cannot be secured and a speed control abnormality occurs in which change in speed is no longer constant.

In this embodiment, as illustrated in FIG. 4, the program look-ahead unit 112 includes the plurality of program look-ahead units, that is, the first program look-ahead unit 112a, the second look-ahead unit 112b to the n-th program look-ahead unit 112n.

In parallel with the first program look-ahead unit 112a looking ahead from the start of the machining program, the second program look-ahead unit 112b to the n-th program look-ahead unit 112n look ahead in the machining program from a block at which a speed control abnormality is likely to occur and stores that block in the memory.

Then, when the program execution unit 111 executes the block at which a speed control abnormality is likely to occur, the block that was already looked ahead by the second program look-ahead unit 112b to the n-th program look-ahead unit 112n and stored in the memory is executed and consumed.

For the sake of brevity, a case in which the program look-ahead unit 112 includes the first program look-ahead unit 112a and the second program look-ahead unit 112b is described here, but the present invention is not limited to this configuration.

The look-ahead blocks calculation unit 113 calculates the look-ahead blocks. This number is the difference between the sequence number of a block that is being executed by the program execution unit 111 and the sequence number of a block that is looked ahead by the program look-ahead unit 112 at the time when the first block is being executed.

In particular, in this embodiment, when the program execution unit 111 executes the first simulation of the machining program, the look-ahead blocks calculation unit 113 calculates the look-ahead blocks as the difference between the sequence number of the block that is being executed and the sequence number of the block that is look-ahead by the first program look-ahead unit 112a.

The exhaustion block detection unit 114 compares the look-ahead blocks to a specified value and detects the block at the point when the look-ahead blocks fall below the specified value.

This block is referred to as an "exhaustion block".

In this embodiment, when the second simulation of the machining program is executed or when the machining program is actually executed, the first program look-ahead unit 112a looks ahead from the start of the machining program and, in parallel with this action, the second program look-ahead unit 112b looks ahead at the machining program from the "exhaustion block".

The look-ahead allocation unit 115 divides a memory (for example, the RAM 13 described above) that stores the blocks look-ahead by the program look-ahead unit 112 between a first region that is used by the first program look-ahead unit 112a and a second region that is used by the second program look-ahead unit 112b.

Further, the look-ahead allocation unit 115 instructs the first program look-ahead unit 112a to perform a look-ahead action of storing look-ahead blocks in the first region while looking ahead from the start of the machining program, and instructs the second program look-ahead unit 112b to perform a look-ahead action of storing look-ahead blocks in the second region while looking ahead from the exhaustion block.

As a result, the first program look-ahead unit 112a stores look-ahead blocks in the first region while looking ahead from the start of the machining program and the second program look-ahead unit 112b stores look-ahead blocks in the second region while looking ahead from the exhaustion block.

The program execution unit 111 first executes the block stored in the first region and, once that block has been consumed, executes and consumes the block stored in the second region.

Figure 5:
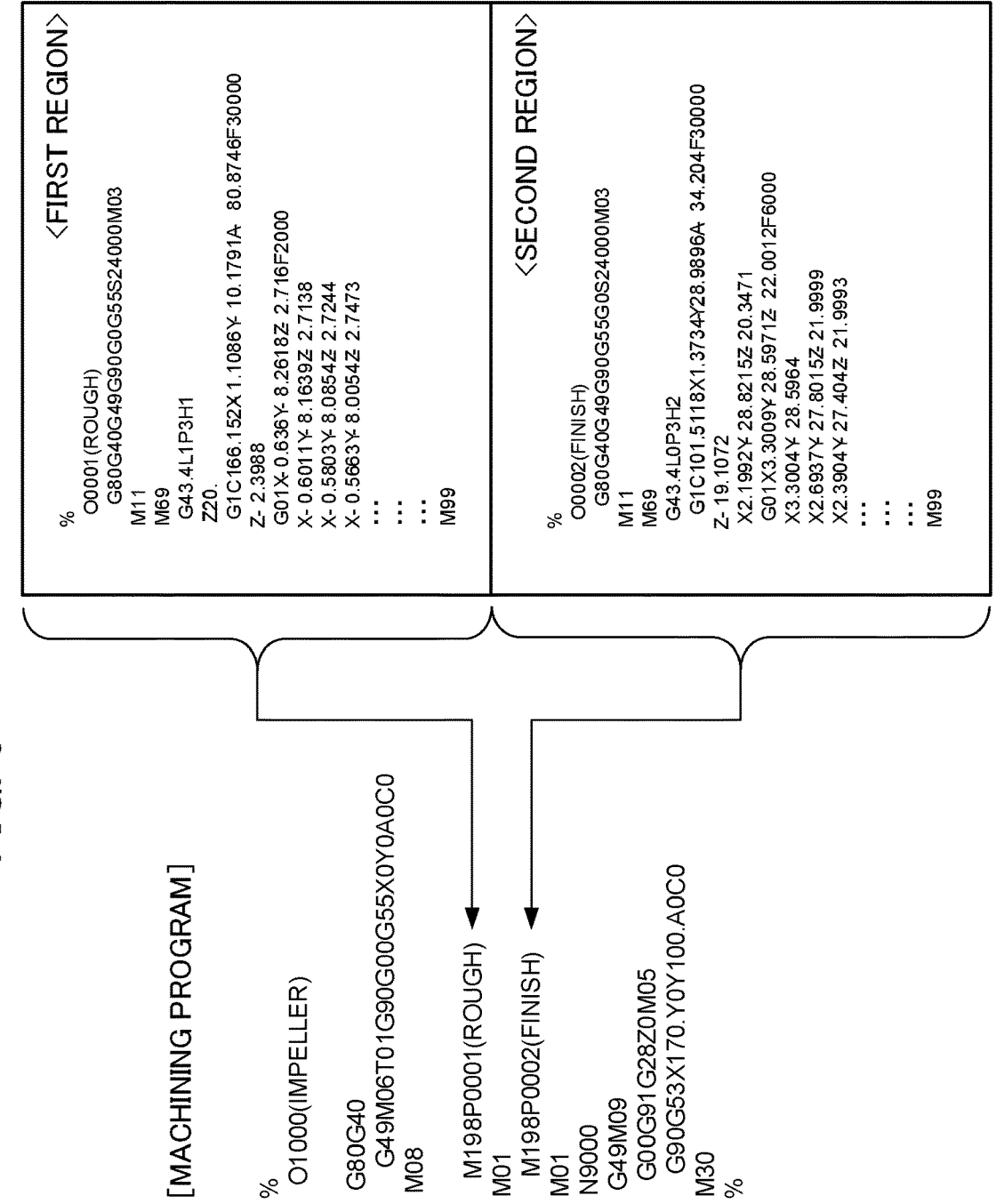
FIG. 5 is a diagram for illustrating an example of memory allocation performed by a look-ahead allocation unit according to the first embodiment of the present invention.

FIG. 5 illustrates an example of look-ahead allocation by the look-ahead allocation unit 115.

In the machining program illustrated in FIG. 5, the number M198P0001 (ROUGH) is an instruction for roughing and the number "M198P0002" (FINISH) is an instruction for finishing. The number "M198P0002 (FINISH)" corresponds to an exhaustion block.

The look-ahead allocation unit 115 divides 1,000 blocks, which is the upper limit of the memory, into 300 blocks to be used by the first program look-ahead unit 112a and 700 blocks to be used by the second program look-ahead unit 112b, and classifies the former blocks as the first region and the latter blocks as the second region.

Then, the look-ahead allocation unit 115 instructs the first program look-ahead unit 112a to perform a look-ahead action of storing look-ahead blocks in the first region while looking ahead from the start of the machining program, and instructs the second program look-ahead unit 112b to perform a look-ahead action of storing look-ahead blocks in the second region while looking ahead from "M198P0002 (FINISH)", which is the exhaustion block.

As a result, 700 blocks included in the exhaustion block are stored in the second region before the program execution unit 111 processes the exhaustion block.

When the program execution unit 111 starts to process the exhaustion block, the second program look-ahead unit 112b looks ahead from the $701^{st}$ block in the exhaustion block because the 700 blocks included in the exhaustion block are already stored in the second region.

In FIG. 5, the memory is divided into the first region and the second region for the sake of brevity, but the memory is not limited to this configuration.

For example, the memory may be divided into any number of regions according to the number of program look-ahead units 112.

Through configuring the numerical controller 100 according to the first embodiment in this way, it is possible to detect a position in the machining program at which a speed control abnormality is likely to occur due to an insufficient look-ahead blocks that are used to determine an acceleration/deceleration operation, and start a look-ahead processing function from the position in parallel with looking ahead at the machining program from the start of the machining program.

Figure 6:
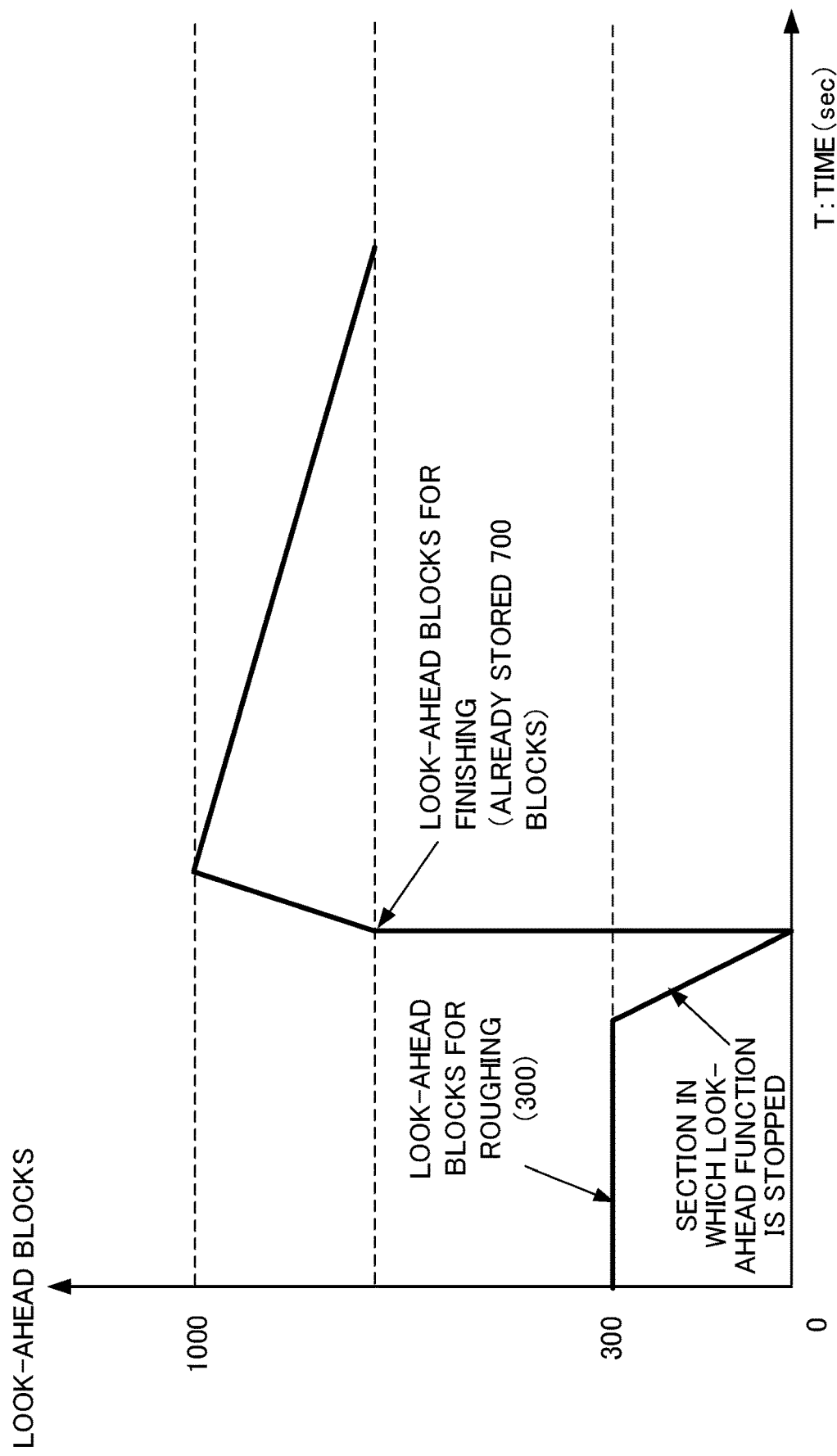
FIG. 6 is a graph for showing difference in the look-ahead blocks over time according to the first embodiment of the present invention.

FIG. 6 is a graph for showing the usual difference in the look-ahead blocks due to the numerical controller 100 according to the first embodiment.

Because only 300 blocks are allocated during roughing, the look-ahead blocks during roughing are maintained at 300 blocks.

Then, in a section at which the look-ahead function stops due to the tool needing to be replaced or a cancel code entering the program, the look-ahead blocks decrease and eventually become zero.

The processing then moves to processing the exhaustion block that corresponds to finishing processing in the machining program. Because the second program look-ahead unit 112b has stored 700 blocks in the second region in the memory, the look-ahead blocks are 700.

Further, the second program look-ahead unit 112b starts to look ahead at blocks after the block stored in the second region of the memory and the look-ahead blocks increase to 1,000.

Then, the look-ahead blocks decrease as the program execution unit 111 executes the machining program, but the look-ahead blocks do not become zero.

<1.2 Operation of Invention>

Now, the operation of the numerical controller 100 according to the first embodiment of the present invention is described with reference to FIGS. 7 to 8.

<1.2.1 Operation when Detecting Exhaustion Block>

Figure 7:
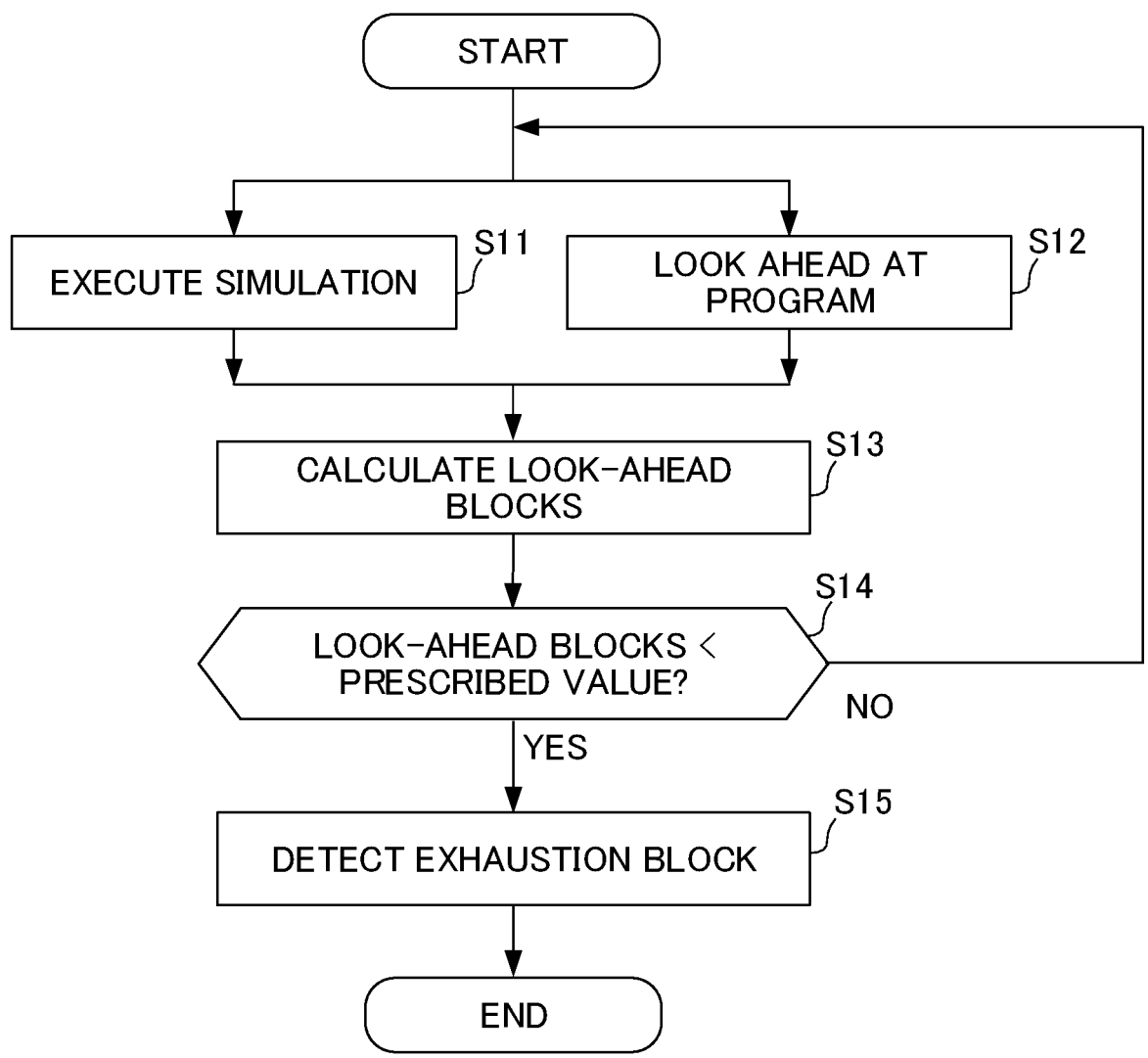
FIG. 7 is a flowchart for illustrating operation of the numerical controller according to the first embodiment of the present invention.

FIG. 7 is a flowchart for illustrating the operation when the exhaustion block is detected.

In Step S11, the program execution unit 111 executes a simulation of the machining program.

In Step S12, in parallel with the machining program simulation executed by the program execution unit 111, the program look-ahead unit 112 (first program look-ahead unit 112a) looks ahead at the machining program before executing the simulation.

In Step S13, the look-ahead blocks calculation unit 113 calculates the look-ahead blocks.

In Step S14, if the look-ahead blocks falls below a prescribed value (S14: YES), the processing moves to Step S15.

If the look-ahead blocks is more than or equal to the prescribed value (S14: NO), the processing moves to Steps S11 and S12.

In S15, the exhaustion block detection unit 114 detects the exhaustion block.

<1.2.2 Operation During Look-Ahead Allocation>

Figure 8:
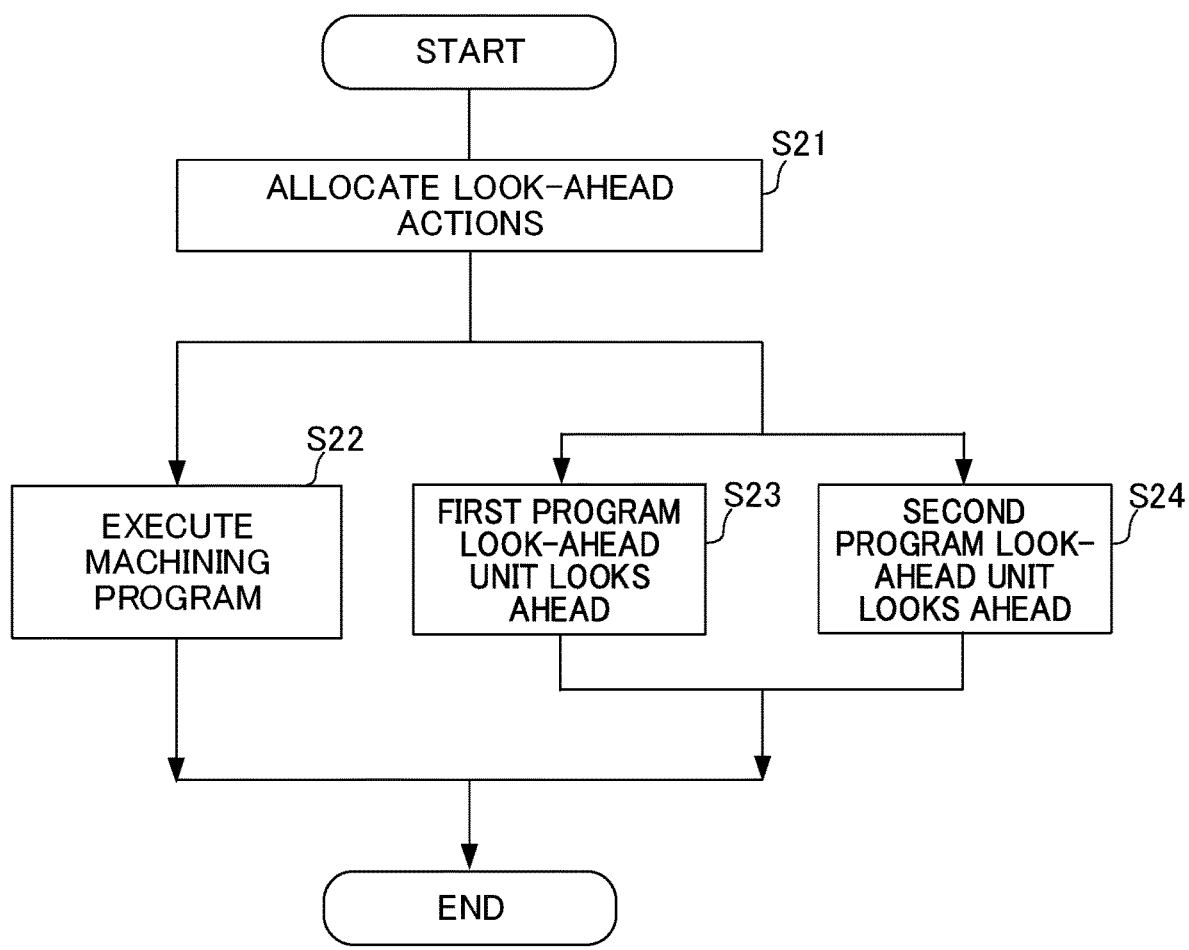
FIG. 8 is a flowchart for illustrating operation of the numerical controller according to the first embodiment of the present invention.

FIG. 8 is a flowchart for illustrating the operation during look-ahead allocation.

In Step S21, the look-ahead allocation unit 115 allocates the look-ahead action for the machining program to the first program look-ahead unit 112a and the second program look-ahead unit 112b.

More specifically, the look-ahead allocation unit 115 divides the memory that stores blocks looked-ahead by the program look-ahead unit 112 into a first region to be used by the first program look-ahead unit 112a and a second region to be used by the second program look-ahead unit 112b.

Then, the look-ahead allocation unit 115 instructs the first program look-ahead unit 112a to perform a look-ahead action of storing look-ahead blocks in the first region while looking ahead from the start of the machining program, and instructs the second program look-ahead unit 112b to perform a look-ahead action of storing look-ahead blocks in the second region while looking ahead from the exhaustion block.

In Step S22, the program execution unit 111 executes the machining program.

In Step S23, the first program look-ahead unit 112a looks ahead from the start of the machining program in parallel with execution of the machining program by the program execution unit 111 before execution of the machining program.

In Step S24, the second program look-ahead unit 112b looks ahead at the machining program from the exhaustion block in parallel with the first program look-ahead unit 112a looking ahead at the machining program.

<1.3 Effects of First Embodiment>

The numerical controller 100 according to the first embodiment of the present invention includes the program look-ahead unit 112 that includes the first program look-ahead unit 112a and the second program look-ahead unit 112b that look ahead at the machining program at the same time from different blocks in the machining program in parallel with execution of the machining program, and the look-ahead allocation unit 115 that divides a memory into at least a first region and a second region, instructs the first program look-ahead unit 112a to perform a look-ahead action of storing look-ahead blocks in the first region and instructs the second program look-ahead unit 112b to perform a look-ahead action of storing look-ahead blocks in the second region.

As a result, it is possible to detect a position in a machining program at which a speed control abnormality is likely to occur due to an insufficient look-ahead blocks that are used to determine an acceleration/deceleration operation, and start a look-ahead processing function from that position in order to stabilize feed rate, cutting speed and other factors.

The numerical controller 100 also includes the look-ahead blocks calculation unit 113 that calculates the look-ahead blocks, the exhaustion block detection unit 114 that detects the exhaustion block at which the look-ahead blocks fall below a prescribed value. After the exhaustion block is detected, the look-ahead allocation unit 115 instructs the first program look-ahead unit 112a to look ahead from the start of the machining program and instructs the second program look-ahead unit 112b to look ahead from the exhaustion block.

As a result, the numerical controller 100 can look ahead from the start of the machining program and look ahead from the exhaustion block at which the look-ahead blocks are insufficient at the same time and in parallel.

<2. Second Embodiment>

Now, a second embodiment of the present invention is described with reference to FIGS. 9 and 10.

For the sake of brevity, only components of a numerical controller 100A according to the second embodiment that are different from those of the numerical controller 100 according to the first embodiment are described below.

<2.1 Configuration of Invention>

The numerical controller 100A according to the second embodiment differs from the numerical controller 100 according to the first embodiment in that the numerical controller 100A includes a CPU 11A in place of the CPU 11.

Figure 9:
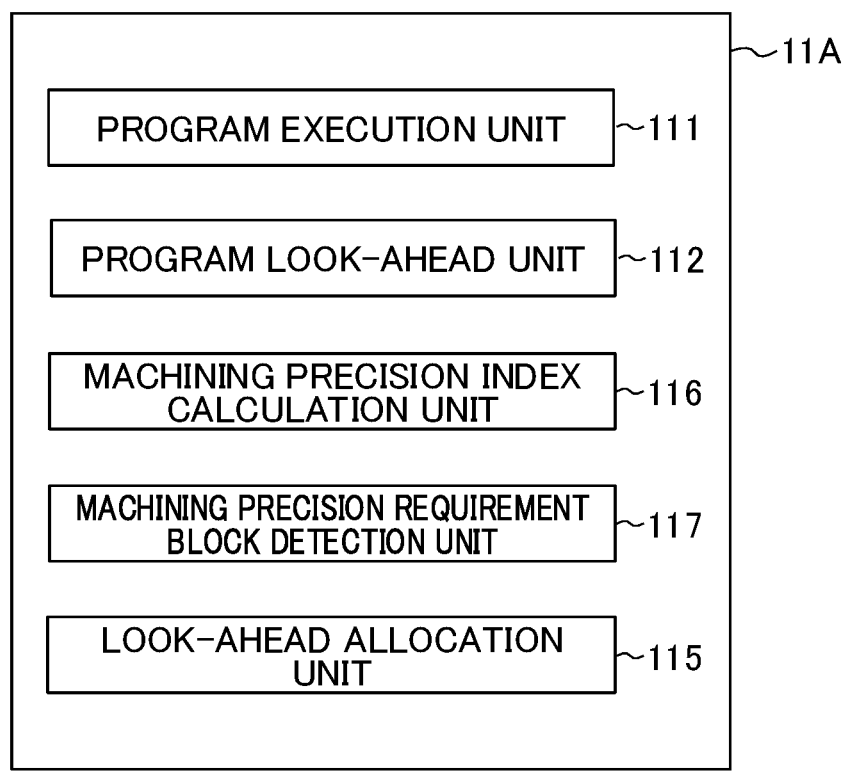
FIG. 9 is a diagram for illustrating function blocks for a numerical controller according to a second embodiment of the present invention.

FIG. 9 is a functional block diagram of the CPU 11A.

The CPU 11A differs from the CPU 11 in that the CPU 11A does not include the look-ahead blocks calculation unit 113 or the exhaustion block detection unit 114 and instead includes a machining precision index calculation unit 116 and a machining precision requirement block detection unit 117.

The machining precision index calculation unit 116 calculates a machining precision index that indicates how much machining precision is required at each block that makes up the machining program.

The machining precision index calculation unit 116 calculates the machining precision index on the basis of the number of minute straight lines machined at each block or the number of lines in subroutines linked to each block.

The machining precision requirement block detection unit 117 compares the machining precision index to a prescribed value to detect a block at which the machining precision index is more than the prescribed value.

This block is referred to as a "machining precision requirement block" herein.

In this embodiment, during the second simulation of the machining program, the first program look-ahead unit 112a looks ahead from the start of the machining program and, in parallel with this action, the second program look-ahead unit 112b looks ahead from the "machining precision requirement block".

<2.2 Operation of Invention>

Now, operation of the numerical controller 100A according to the second embodiment of the present invention is described with reference to FIG. 10.

<2.2.1 Operation when Detecting Machining Precision Requirement Block>

Figure 10:
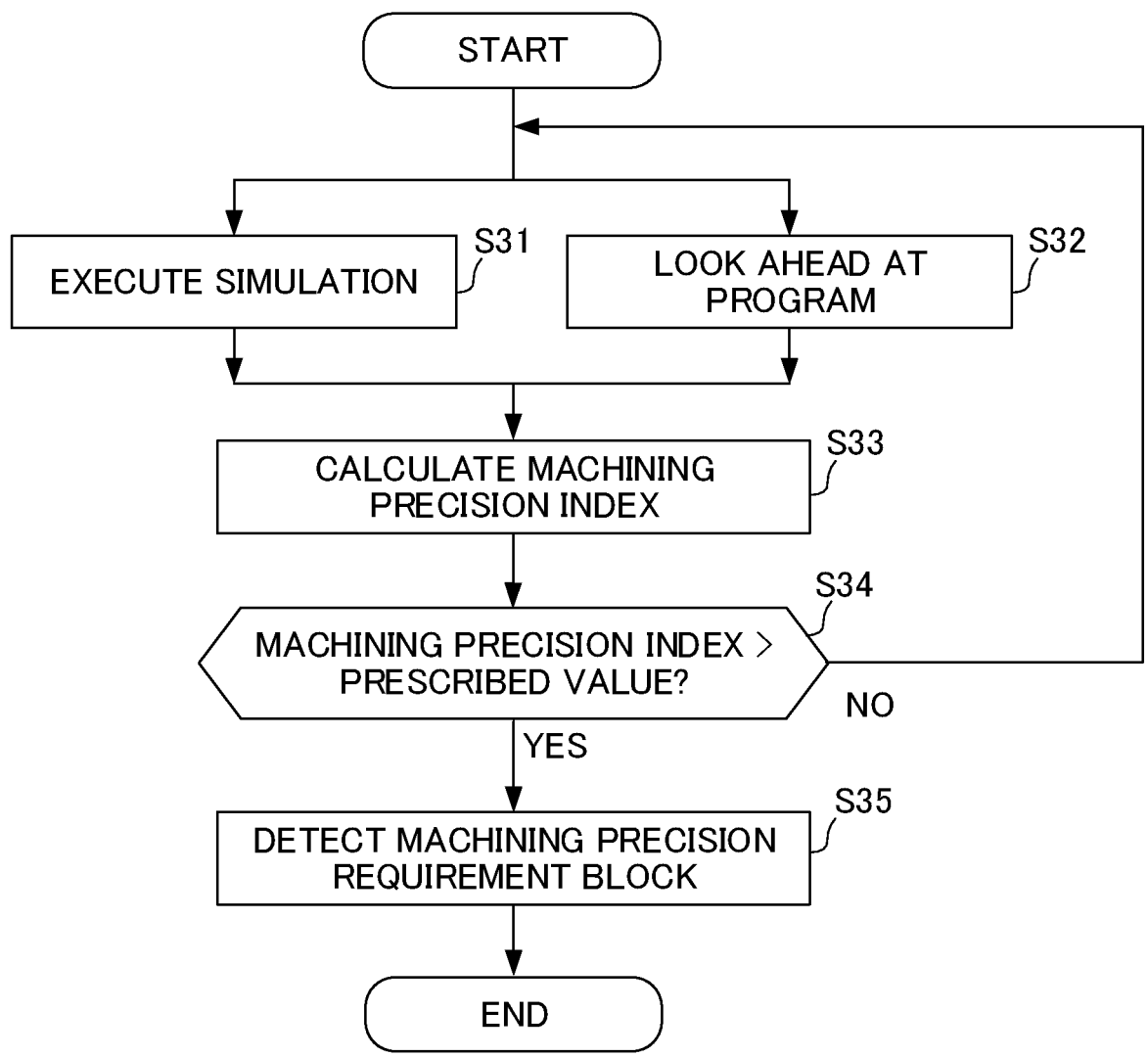
FIG. 10 is a diagram for illustrating operation of the numerical controller according to a second embodiment of the present invention.
Figure 11:
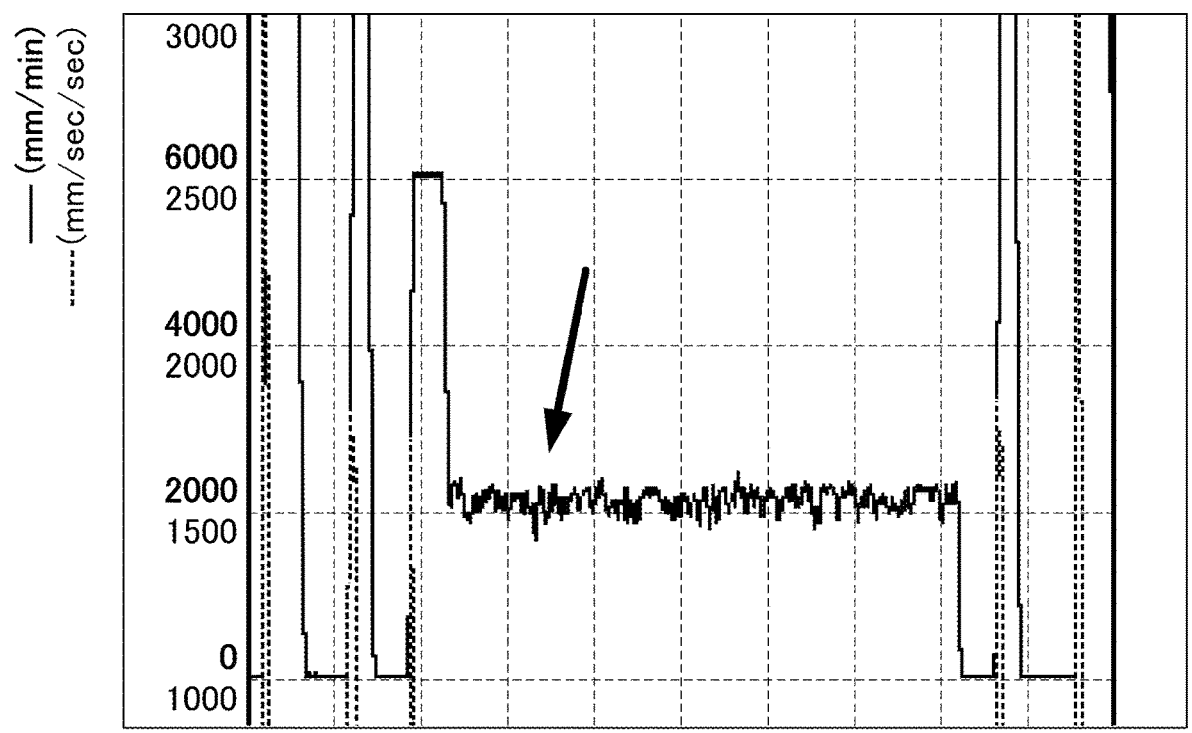
FIG. 11 is a graph for showing speed instability due to inability to secure look-ahead blocks.
Figure 12:
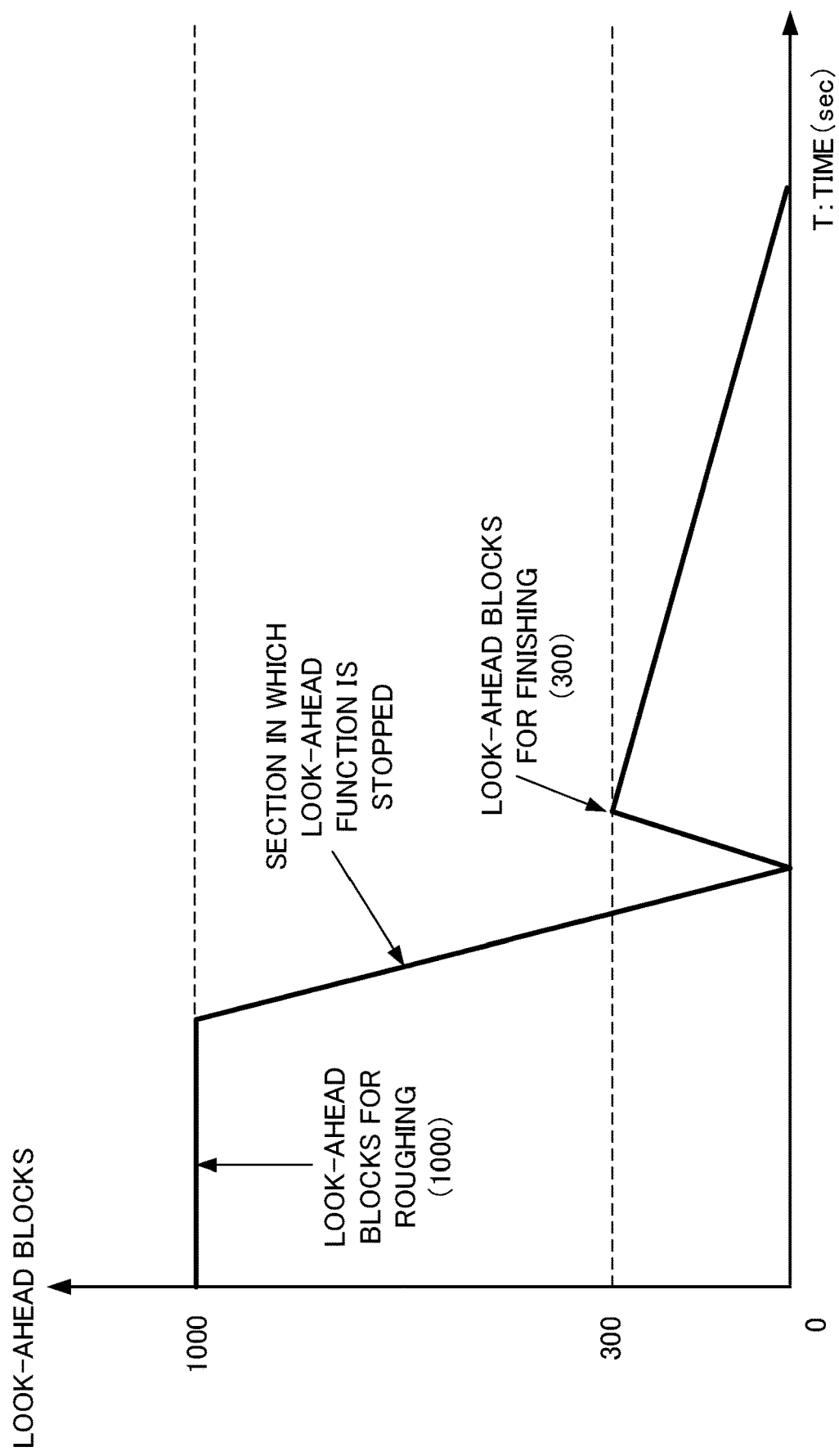
FIG. 12 is a graph for showing difference in the look-ahead blocks over time in the prior art.

FIG. 10 is a flowchart for illustrating the operation when the machining precision requirement block is detected.

In Step S31, the program execution unit 111 executes a simulation of the machining program.

In Step S32, in parallel with the machining program simulation executed by the program execution unit 111, the program look-ahead unit 112 (first program look-ahead unit 112a) looks ahead at the machining program before executing the simulation.

In Step S33, the machining precision index calculation unit 116 calculates the machining precision index.

In Step S34, if the machining precision index is more than a prescribed value (S34: YES), the processing moves to Step S35.

If the machining precision index is less than or equal to the prescribed value (S34: NO), the processing moves to Steps S31 and S32.

In Step S35, the machining precision requirement block detection unit 117 detects the machining precision requirement block.

<2.2.2 Operation During Look-Ahead Allocation>

The operation during look-ahead allocation by the numerical controller 100A according to the second embodiment is the same as the during look-ahead allocation by the numerical controller 100 according to the first embodiment except that the second program look-ahead unit 112b looks ahead from the machining precision requirement block instead of the exhaustion block.

<2.3 Effects of Second Embodiment>

The numerical controller 100A further includes the machining precision index calculation unit 116 that calculates the machining precision index that indicates machining precision at each block of the machining program, and the machining precision requirement block detection unit 117 that detects a machining precision requirement block, which is a block at which the machining precision index is more than a prescribed value. After the machining precision requirement block is detected, the look-ahead allocation unit 115 instructs the first program look-ahead unit 112a to look ahead from a start block of the machining program and instructs the second program look-ahead unit 112b to look ahead from the machining precision requirement block.

As a result, the numerical controller 100A can look ahead from the start of the machining program and look ahead from the machining precision requirement block at which high machining precision is required at the same time and in parallel.

<4. Modification Examples>

<4.1 Modification Example 1>

In the first embodiment described above, the exhaustion block detection unit 114 defines an exhaustion block as a block at which the look-ahead blocks fall below a prescribed value, but the present invention is not limited to this configuration.

For example, the exhaustion block detection unit 114 may define an exhaustion block as a block at which the rate of reduction of the look-ahead blocks exceeds a prescribed value.

<4.2 Modification Example 2>

In the above-described embodiment, the operation when detecting the exhaustion block and the operation when detecting the machining precision requirement block are performed when the program execution unit 111 executes the machining program simulation, but the present invention is not limited to this configuration.

For example, similar operations may be performed during actual machining in which the numerical controller 100 or 100A controls the machine tool 200.

<4.3 Modification Example 3>

In the above-described embodiment, the numerical controller 100 detects the position of the exhaustion block and the second program look-ahead unit 112b looks ahead from the exhaustion block, but the numerical controller 100 is not limited to this configuration.

For example, the numerical controller 100 may detect the number of seconds from the start of execution of the machining program, which corresponds to the exhaustion block, and the second program look-ahead unit 112b may look ahead from the number of seconds.

Similarly, the numerical controller 100A may detect the number of seconds from the start of execution of the machining program, which corresponds to the exhaustion block, instead of the position of the machining precision requirement block and the second program look-ahead unit 112b may look ahead from the number of seconds.

Embodiments of the present invention have been described above, but the present invention is not limited to the above-described embodiments.

Any described effects are merely the best effects achieved by the present invention and are not limited to the description provided herein.

The control method used by the numerical controller 100 or 100A is implemented by software.

When using software, the programs constitute said software are installed on a computer (numerical controller 100 or 100A).

These programs may be recorded on a removable medium and distributed to a user or may be made available as a file to be downloaded to a user's computer via a network.

These programs may also be provided to a user's computer (numerical controller 100 or 100A) as an Internet service via a network, instead of being downloaded.

EXPLANATION OF REFERENCE NUMERALS 10 control system
100 numerical controller 111 program execution unit
112, 112a, 112b, 112n program look-ahead unit
113 look-ahead blocks calculation unit
114 exhaustion block detection unit
115 look-ahead allocation unit
116 machining precision index calculation unit
117 machining precision requirement block detection unit
200 machine tool

What is claimed is:

1. A numerical controller for controlling a machine tool that has axes by executing a machining program that is made up of a plurality of blocks and that controls acceleration/deceleration of the axes,
the numerical controller comprising a processor and a storage device,
the processor being configured to:
execute the machining program;
simultaneously look ahead at the machining program from different blocks;
divide the storage device into at least a first region and a second region and perform a look-ahead action of storing look-ahead blocks in the first region and perform a look-ahead action of storing look-ahead blocks in the second region;
use the look-ahead blocks stored in the first region to look ahead from a start block of the machining program and in parallel use the look-ahead blocks stored in the second region to look ahead from a different block of the machining program to determine an acceleration/deceleration operation of the machine tool; and
control the axes of the machine tool based on the determined acceleration/deceleration operation.

2. The numerical controller according to claim 1, wherein the processor is further configured to:
calculate a number of look-ahead blocks, the number being a difference between a first sequence number that is the number of a block being executed by the program execution unit and a second sequence number that is the number of a block that is being looked ahead by the first program look-ahead unit while the block is being executed; and
detect an exhaustion block, which is a block at which the look-ahead blocks falls below a prescribed value,
wherein, after the exhaustion block is detected, the processor looks ahead from the start block of the machining program and in parallel looks ahead from the exhaustion block.

3. The numerical controller according to claim 1, wherein the processor is further configured to:
calculate a machining precision index that indicates machining precision at each block of the machining program; and
detect a machining precision requirement block, which is a block at which the machining precision index is more than a prescribed value,
wherein, after the machining precision requirement is detected, the processor looks ahead from the start block of the machining program and in parallel looks ahead from the machining precision requirement block.

4. The numerical controller of claim 1, wherein the different block of the machining program is a block other than the start block of the machining program.

5. The numerical controller of claim 1, wherein the storage device is a random access memory.

* * * * *